(12) United States Patent
Park et al.

(10) Patent No.: US 12,486,372 B2
(45) Date of Patent: Dec. 2, 2025

(54) COMPOSITE FILM AND DISPLAY DEVICE COMPRISING SAME

(71) Applicant: SK microworks solutions Co., Ltd., Chungcheongnam-do (KR)

(72) Inventors: Jun-Ki Park, Chungcheongnam-do (KR); Seok-Jong Woo, Chungcheongnam-do (KR); Hyung-Woo Cho, Chungcheongnam-do (KR); Seung-Yong Pyun, Chungcheongnam-do (KR)

(73) Assignee: SK microworks solutions Co., Ltd., Chungcheongnam-do (KR)

( * ) Notice: Subject to any disclaimer, the term of this patent is extended or adjusted under 35 U.S.C. 154(b) by 49 days.

(21) Appl. No.: 18/074,650

(22) Filed: Dec. 5, 2022

(65) Prior Publication Data

US 2023/0272175 A1    Aug. 31, 2023

(30) Foreign Application Priority Data

Feb. 25, 2022  (KR) .......................... 10-2022-0025534

(51) Int. Cl.
| | |
|---|---|
| *C08J 7/04* | (2020.01) |
| *C08J 7/044* | (2020.01) |
| *G02B 1/14* | (2015.01) |
| *G06F 1/16* | (2006.01) |

(52) U.S. Cl.
CPC .............. *C08J 7/042* (2013.01); *C08J 7/044* (2020.01); *G02B 1/14* (2015.01); *G06F 1/1652* (2013.01); *C08J 2367/00* (2013.01); *C08J 2433/14* (2013.01)

(58) Field of Classification Search
CPC ....................... G02B 1/14; G06F 1/00–1/3296
See application file for complete search history.

(56) References Cited

U.S. PATENT DOCUMENTS

| | | | |
|---|---|---|---|
| 2017/0028677 A1* | 2/2017 | Lee | ................. B32B 27/281 |
| 2020/0010736 A1* | 1/2020 | Lee | ................. B32B 27/30 |
| 2020/0071560 A1 | 3/2020 | Shibai et al. | |
| 2020/0263055 A1 | 8/2020 | Shibai et al. | |
| 2021/0060908 A1 | 3/2021 | Yang et al. | |

FOREIGN PATENT DOCUMENTS

| | | |
|---|---|---|
| JP | 2011175397 A | 9/2011 |
| JP | 2019105830 A | 6/2019 |
| KR | 10-2019-0026611 A | 3/2019 |

(Continued)

OTHER PUBLICATIONS

Office Action on the Japanese Patent Application No. 2022-201639 issued by the Japanese Patent Office on Sep. 5, 2023.

(Continued)

*Primary Examiner* — Prashant J Khatri
(74) *Attorney, Agent, or Firm* — IP & T GROUP LLP

(57) ABSTRACT

In the composite film according to the embodiment, an elastic layer in which its modulus change characteristics with respect to temperature have been adjusted to a certain range is coated onto the opposite side to a hard coating layer; thus, it is possible to enhance the surface hardness and elastic recovery characteristics of the hard coating layer. Thus, it can be advantageously applied as a cover window of a flexible display device.

5 Claims, 4 Drawing Sheets

(56) References Cited

FOREIGN PATENT DOCUMENTS

| | | |
|---|---|---|
| KR | 20190037116 A | 4/2019 |
| KR | 102286935 B1 | 8/2021 |
| WO | 2017104520 A1 | 6/2017 |
| WO | 2018173867 A1 | 9/2018 |

OTHER PUBLICATIONS

Office Action for the Korean Patent Application No. 10-2022-0025534 issued by the Korean Intellectual Property Office on Apr. 11, 2024.

* cited by examiner

[Fig. 1]
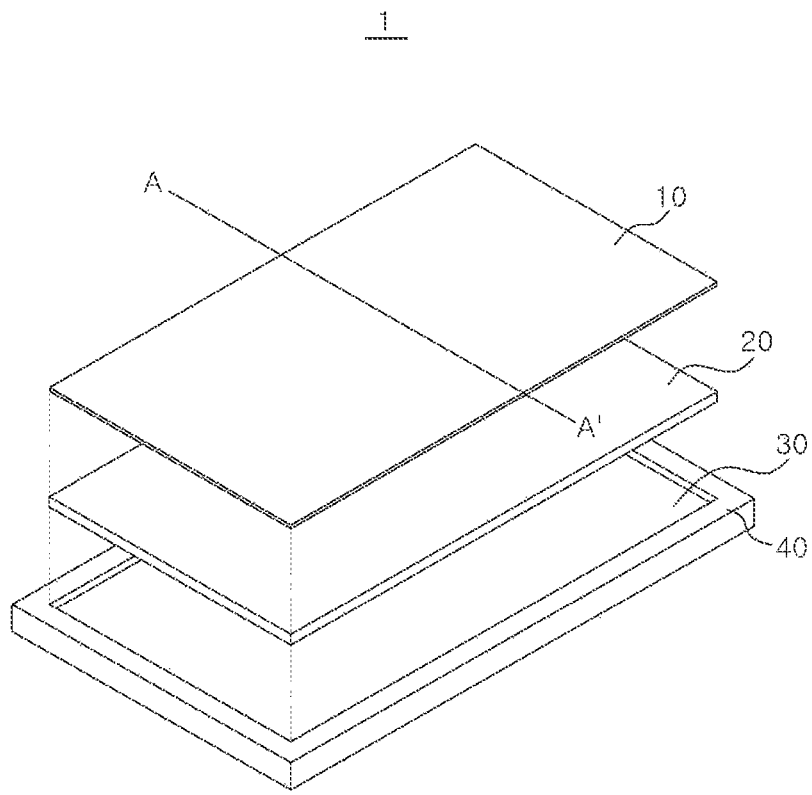
[Fig. 2]
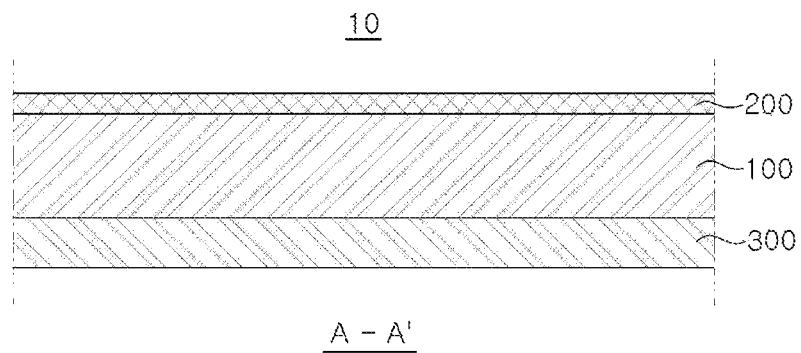
A − A'

[Fig. 3]
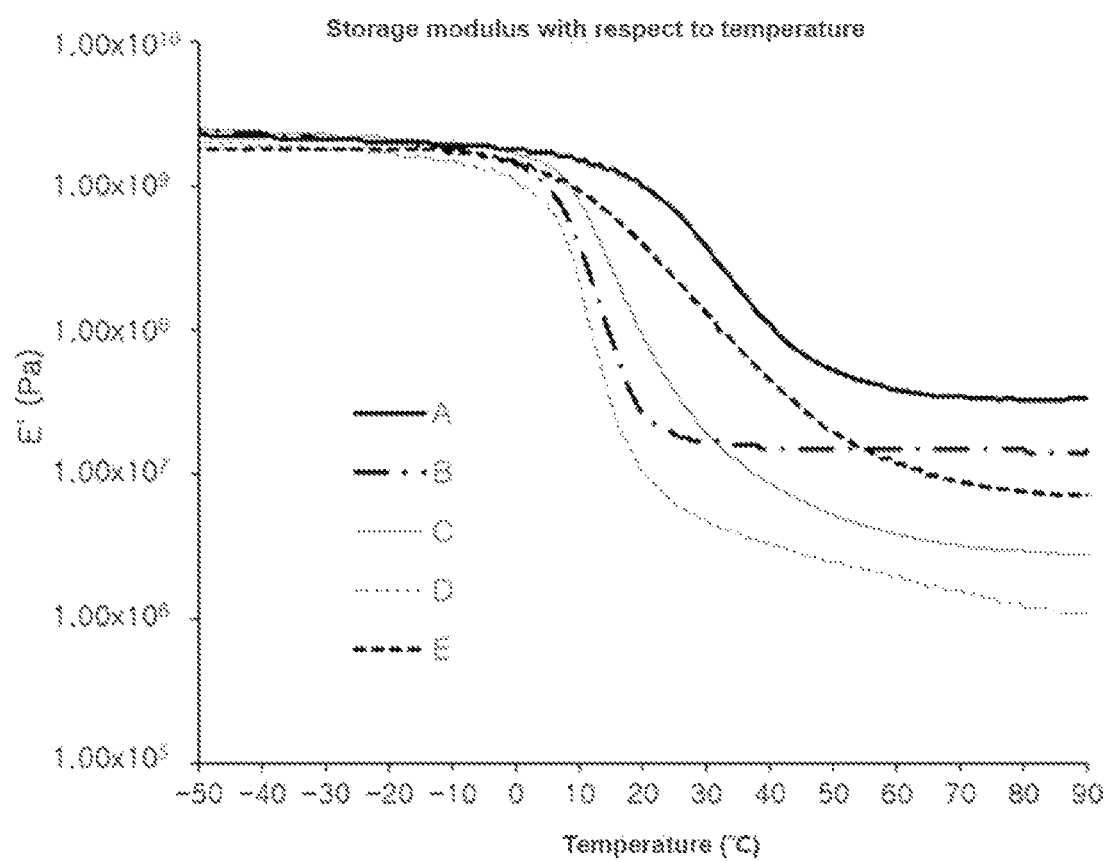

[Fig. 4]
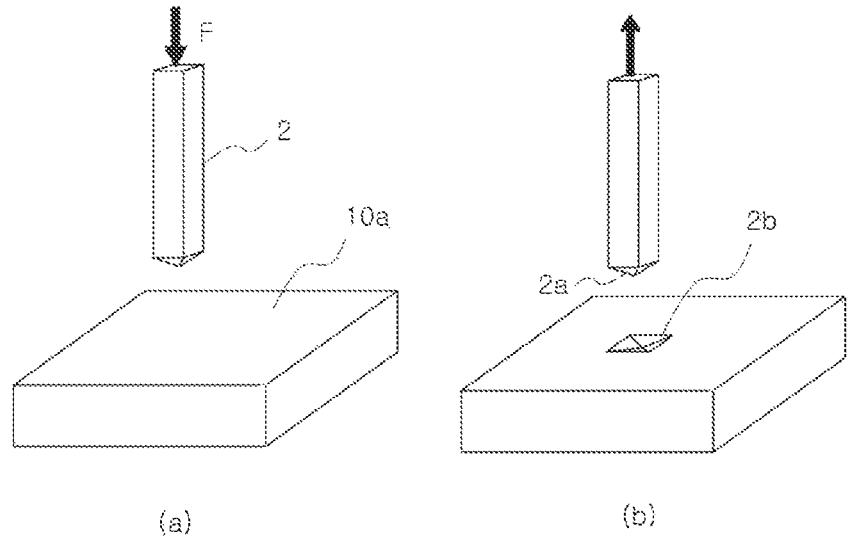
[Fig. 5]
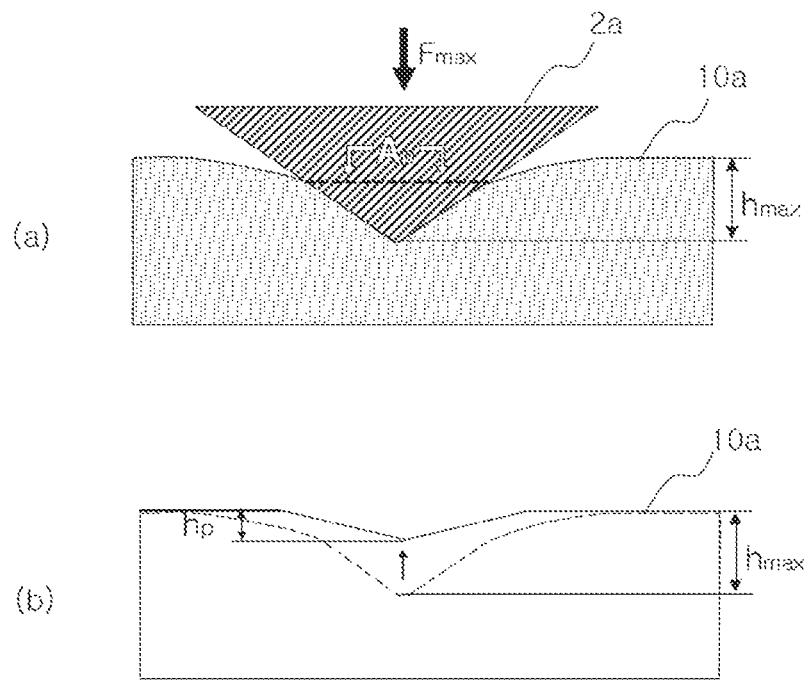

[Fig. 6a]
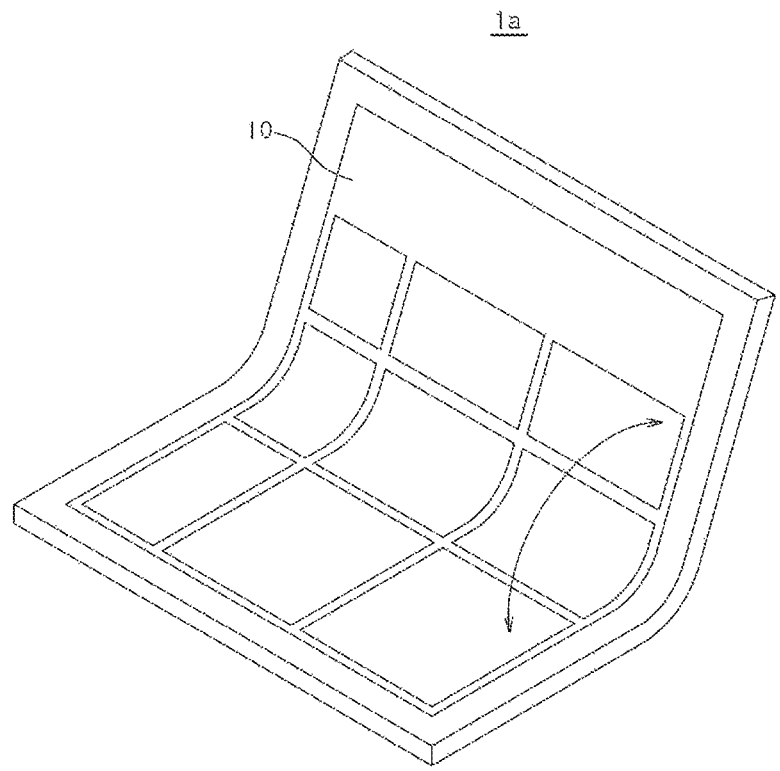
[Fig. 6b]
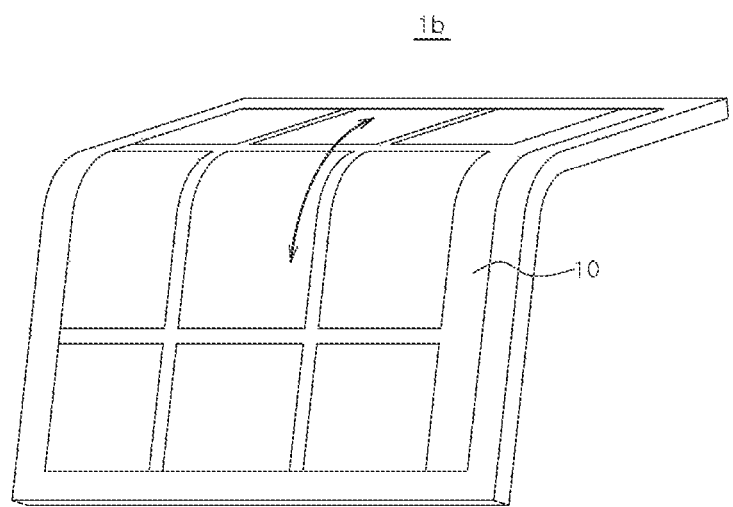

COMPOSITE FILM AND DISPLAY DEVICE COMPRISING SAME

CROSS-REFERENCE TO RELATED APPLICATION

This application claims benefit of priority to Korean Patent Application No. 10-2022-0025534 filed on Feb. 25, 2022 in the Korean Intellectual Property Office, the disclosure of which is incorporated herein by reference in its entirety.

TECHNICAL FIELD

Embodiments relate to a composite film with excellent surface hardness and a display device comprising the same.

Background Art

Display technologies continue to develop driven by the demand in tandem with the development in IT devices. Technologies on curved displays and bent displays have already been commercialized. In recent years, flexible display devices that can be flexibly bent or folded in response to an external force are preferred in the field of mobile devices that require large screens and portability at the same time. In particular, a foldable display device has the great advantages that it is folded to a small size to enhance its portability when not in use, and it is unfolded to form a large screen when in use.

The cover window in such a flexible display device is required to be flexible and have restorability. In addition, in an out-folding type, in which the display is exposed to the outside, it is required to have not only flexible characteristics, but also protection against external forces.

A display device mainly adopts a polymer film such as transparent polyimide or polyester or a glass substrate for its cover window. But a polymer film is vulnerable to external scratches, and a glass substrate has a problem of lack of flexibility.

In order to solve this problem, Korean Laid-open Patent Publication No. 2019-0026611 discloses a hard coating film manufactured by sequentially forming a high bending layer and a high hardness layer using a siloxane resin on a transparent substrate to enhance scratch resistance and flexibility.

PRIOR ART DOCUMENT

Patent Document (Patent Document 1) Korean Laid-open Patent Publication No. 2019-0026611

DISCLOSURE OF INVENTION

Technical Problem

In order to increase the surface hardness of a hard coating film applied to the cover window of a flexible display device, it is generally attempted to increase the thickness of the hard coating layer (upper coating layer) or change the composition of the hard coating layer. In such an event, however, the hard coating layer may generally lose its flexible characteristics as its brittleness becomes stronger.

As a result of research conducted by the present inventors, therefore, it has been discovered that, as an elastic layer in which its modulus change characteristics with respect to temperature have been adjusted to a certain range is introduced onto the opposite side (i.e., the lower side of the base film) to the hard coating layer, it is possible to enhance the surface hardness and elastic recovery characteristics of the hard coating layer without increasing the thickness of the hard coating layer or changing the composition of the hard coating layer.

Accordingly, the embodiments to be described below aim to provide a composite film having high surface hardness and elastic recovery force, along with flexible characteristics, and a display device comprising the same.

Solution to Problem

According to an embodiment, there is provided a composite film, which comprises a base film; a hard coating layer disposed on one side of the base film; and an elastic layer disposed on the other side of the base film, wherein the $\Delta E'$ value according to the following Equation (1) is 300 or less:

$$\Delta E' = E'[-30°\ C.]/E'[50°\ C.] \tag{1}$$

Here, $E'[-30°\ C.]$ is the storage modulus (Pa) of the elastic layer at $-30°$ C., and $E'[50°\ C.]$ is the storage modulus (Pa) of the elastic layer at $50°$ C.

According to another embodiment, there is provided a display device, which comprises a display panel; and a cover window disposed on the front side of the display panel, wherein the cover window comprises a base film; a hard coating layer disposed on one side of the base film; and an elastic layer disposed on the other side of the base film, and the $\Delta E'$ value according to the above Equation (1) is 300 or less.

Advantageous Effects of Invention

In the composite film according to the embodiment, an elastic layer in which its modulus change characteristics with respect to temperature have been adjusted to a certain range is coated onto the opposite side (i.e., the lower side of the base film) to the hard coating layer; thus, it is possible to enhance the surface hardness and elastic recovery characteristics of the hard coating layer.

Accordingly, the composite film according to the embodiment, when applied as a cover window of a display device, for example, a cover window of an out-folding type device in which the display is exposed to the outside or an in-folding type device as shown in FIGS. 6a and 6b, can have protection against external forces, along with flexible characteristics.

BRIEF DESCRIPTION OF DRAWINGS

FIG. 1 is an exploded perspective view of a display device according to an embodiment.

FIG. 2 is a cross-sectional view of a composite film (cover window) according to an embodiment.

FIG. 3 is a storage modulus curve with respect to the temperature of various elastic layers measured by a dynamic mechanical analyzer (DMA).

FIG. 4 shows before (a) and after (b) the indentation of a sample in a nanoindentation test.

FIG. 5 shows a cross-sectional view of a sample at the time of indentation (a) and release (b) by an indenter tip.

FIGS. 6a and 6b each show in-folding and out-folding type flexible display devices.

EXPLANATION OF REFERENCE NUMERALS

1: display device, 1a: in-folding type flexible display device, 1b: out-folding type flexible display device, 2: indenter, 2a: indenter tip, 2b: mark, 10: composite film (cover window), 10a: sample, 20: display panel, 30: substrate, 40: frame, 100: base film, 200: hard coating layer, 300: elastic layer, $F_{max}$: maximum test force, $A_p$: contact projection area at maximum test force, $h_{max}$: maximum depth at maximum test force, $h_p$: permanent depth not restored after release of test force

BEST MODE FOR CARRYING OUT THE INVENTION

Hereinafter, various embodiments and examples will be described in detail by referring to the drawings.

In the description of the following embodiments, if it is determined that a detailed description of a relevant known constitution or function may obscure the subject matter, the detailed description thereof will be omitted. In addition, the sizes of individual elements in the drawings may be exaggeratedly depicted or omitted for the sake of description, and they may differ from the actual sizes.

In the present specification, when one component is described to be formed on/under another component or connected or coupled to each other, it covers the cases where these components are directly or indirectly formed, connected, or coupled through another component. In addition, it should be understood that the reference for the on/under position of each component may vary depending on the direction in which the object is observed.

In this specification, terms referring to the respective components are used to distinguish them from each other and are not intended to limit the scope of the embodiment. In addition, in the present specification, a singular expression is interpreted to cover a plural number as well unless otherwise specified in context.

In the present specification, the term "comprising" is intended to specify a particular characteristic, region, step, process, element, and/or component. It does not exclude the presence or addition of any other characteristic, region, step, process, element and/or component, unless specifically stated to the contrary.

In the present specification, the terms first, second, and the like are used to describe various components. But the components should not be limited by the terms. The terms are used for the purpose of distinguishing one element from another.

The molecular weight of a compound or polymer described in the present specification, for example, a number average molecular weight or a weight average molecular weight, is a relative mass based on carbon-12 as is well known. Although its unit is not described, it may be understood as a molar mass (g/mole) of the same numerical value, if necessary.

In the present specification, the term "substituted" means to be substituted with at least one substituent group selected from the group consisting of deuterium, —F, —Cl, —Br, —I, a hydroxyl group, a cyano group, a nitro group, an amino group, an amido group, a hydrazine group, a hydrazone group, an ester group, a ketone group, a carboxyl group, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_6$-$C_{30}$ alicyclic organic group, a substituted or unsubstituted $C_4$-$C_{30}$ heterocyclic group, a substituted or unsubstituted $C_6$-$C_{30}$ aryl group, and a substituted or unsubstituted $C_4$-$C_{30}$ heteroaryl group. Two substituents adjacent to each other may be linked to form a ring.

FIG. 1 is an exploded perspective view of a display device according to an embodiment.

Referring to FIG. 1, a display device (1) according to an embodiment comprises a display panel (20); and a cover window (10) disposed on the front side (viewing side) of the display panel (20). Specifically, the display device (1) comprises a cover window (10), a display panel (20), a substrate (30), and a frame (40) protecting them. In addition, an adhesive layer may be interposed between the cover window (10) and the display panel (20). For example, the adhesive layer may comprise an optically transparent adhesive.

The display device according to an embodiment may be flexible. For example, the display device may be a flexible display device or a foldable display device.

The display panel (20) may be a liquid crystal display (LCD) panel. Alternatively, the display panel (20) may be an organic light emitting display (OLED) panel. The organic light emitting display device may comprise a front polarizing plate and an organic light emitting display panel. The front polarizing plate may be disposed on the front side of the organic light emitting display panel. In more detail, the front polarizing plate may be bonded to the side of the organic light emitting display panel where an image is displayed. The organic light emitting display panel displays an image by self-emission of a pixel unit. The organic light emitting display panel comprises an organic light emitting substrate and a driving substrate. The organic light emitting substrate comprises a plurality of organic light emitting units that correspond to respective pixels. The organic light emitting units each comprise a cathode, an electron transport layer, a light emitting layer, a hole transport layer, and an anode. The driving substrate is operatively coupled to the organic light emitting substrate. That is, the driving substrate may be coupled to the organic light emitting substrate so as to apply a driving signal such as a driving current. More specifically, the driving substrate may drive the organic light emitting substrate by applying a current to each of the organic light emitting units.

The composite film according to an embodiment is applied to the display device (1) as a cover window (10). FIG. 2 is a cross-sectional view of a cover window (that is, a composite film according to an embodiment) according to an embodiment (A-A' of FIG. 1).

Referring to FIG. 2, the cover window (10) according to an embodiment comprises a base film (100); and a hard coating layer (200) disposed on one side of the base film (100); and an elastic layer (300) disposed on the other side of the base film.

Characteristics of the Film

In the composite film, an elastic layer in which its modulus change characteristics with respect to temperature have been adjusted to a certain range is coated onto the opposite side (i.e., the lower side of the base film) to the hard coating layer; thus, it is possible to enhance the surface hardness and elastic recovery characteristics of the hard coating layer.

The modulus change with respect to the temperature may be measured by, for example, a dynamic mechanical analyzer (DMA).

According to an embodiment, the ΔE' value according to the following Equation (1) is 300 or less.

$$\Delta E' = E'[-30°\ C.]/E'[50°\ C.] \qquad (1)$$

Here, E'[−30° C.] is the storage modulus (Pa) of the elastic layer at −30° C., and E'[50° C.] is the storage modulus (Pa) of the elastic layer at 50° C.

For example, the ΔE' value according to the above Equation (1) may be 300 or less, 250 or less, 200 or less, 150 or less, 100 or less, or 50 or less. In addition, the ΔE' value according to the above Equation (1) may be 1 or more, greater than 1, 2 or more, 10 or more, 20 or more, 30 or more, 50 or more, or 100 or more. As a specific example, the ΔE' value according to the above Equation (1) may be 2 to 300 or 10 to 200.

In addition, in the elastic layer, the modulus for each temperature may be adjusted within a predetermined range.

As an example, the storage modulus of the elastic layer at −30° C. may be $3 \times 10^8$ Pa or more, $5 \times 10^8$ Pa or more, $7 \times 10^8$ Pa or more, or $1 \times 10^9$ Pa or more. In addition, the storage modulus of the elastic layer at −30° C. may be $1 \times 10^{10}$ Pa or less, $7 \times 10^9$ Pa or less, $5 \times 10^9$ Pa or less, or $3 \times 10^9$ Pa or less.

As another example, the storage modulus of the elastic layer at −10° C. may be $1 \times 10^8$ Pa or more, $5 \times 10^8$ Pa or more, $7 \times 10^8$ Pa or more, or $1 \times 10^9$ Pa or more. In addition, the storage modulus of the elastic layer at −10° C. may be $1 \times 10^{10}$ Pa or less, $7 \times 10^9$ Pa or less, $5 \times 10^9$ Pa or less, or $3 \times 10^9$ Pa or less.

As another example, the storage modulus of the elastic layer at 10° C. may be $5 \times 10^7$ Pa or more, $7 \times 10^7$ Pa or more, $1 \times 10^8$ Pa or more, or $3 \times 10^8$ Pa or more. In addition, the storage modulus of the elastic layer at 10° C. may be $1 \times 10^{10}$ Pa or less, $7 \times 10^9$ Pa or less, $5 \times 10^9$ Pa or less, or $3 \times 10^9$ Pa or less.

As another example, the storage modulus of the elastic layer at room temperature (25° C.) may be $1 \times 10^6$ Pa or more, $5 \times 10^6$ Pa or more, $7 \times 10^6$ Pa or more, or $1 \times 10^7$ Pa or more. In addition, the storage modulus of the elastic layer at room temperature (25° C.) may be $1 \times 10^{10}$ Pa or less, $5 \times 10^9$ Pa or less, $1 \times 10^9$ Pa or less, or $7 \times 10^8$ Pa or less.

As another example, the storage modulus of the elastic layer at 30° C. may be $1 \times 10^6$ Pa or more, $5 \times 10^6$ Pa or more, $7 \times 10^6$ Pa or more, or $1 \times 10^7$ Pa or more. In addition, the storage modulus of the elastic layer at 30° C. may be $1 \times 10^{10}$ Pa or less, $5 \times 10^9$ Pa or less, $3 \times 10^9$ Pa or less, or $1 \times 10^9$ Pa or less.

As another example, the storage modulus of the elastic layer at 50° C. may be $1 \times 10^6$ Pa or more, $5 \times 10^6$ Pa or more, $7 \times 10^6$ Pa or more, or $1 \times 10^7$ Pa or more. In addition, the storage modulus of the elastic layer at 50° C. may be $1 \times 10^9$ Pa or less, $5 \times 10^8$ Pa or less, $3 \times 10^8$ Pa or less, or $1 \times 10^8$ Pa or less.

As another example, the storage modulus of the elastic layer at 70° C. may be $5 \times 10^5$ Pa or more, $1 \times 10^6$ Pa or more, $5 \times 10^6$ Pa or more, or $8 \times 10^6$ Pa or more. In addition, the storage modulus of the elastic layer at 70° C. may be $5 \times 10^8$ Pa or less, $1 \times 10^8$ Pa or less, $7 \times 10^7$ Pa or less, or $5 \times 10^7$ Pa or less.

As another example, the storage modulus of the elastic layer at 90° C. may be $5 \times 10^5$ Pa or more, $1 \times 10^6$ Pa or more, $5 \times 10^6$ Pa or more, or $7 \times 10^6$ Pa or more. In addition, the storage modulus of the elastic layer at 90° C. may be $5 \times 10^8$ Pa or less, $1 \times 10^8$ Pa or less, $7 \times 10^7$ Pa or less, or $5 \times 10^7$ Pa or less.

As a specific example, the storage modulus of the elastic layer may be $1 \times 10^9$ Pa to $3 \times 10^9$ Pa at −30° C., $1 \times 10^9$ Pa to $3 \times 10^9$ Pa at −10° C., $3 \times 10^8$ Pa to $3 \times 10^9$ Pa at 10° C., $1 \times 10^7$ Pa to $1 \times 10^9$ Pa at 30° C., and $1 \times 10^7$ Pa to $1 \times 10^8$ Pa at 50° C.

As another specific example, the storage modulus of the elastic layer may be $1 \times 10^9$ Pa to $3 \times 10^9$ Pa-30° C. and $1 \times 10^7$ Pa to $1 \times 10^8$ Pa at 50° C.

In particular, the storage modulus of the elastic layer may be more differentiated at high temperatures. Specifically, the storage modulus of the elastic layer may be $1 \times 10^7$ Pa or more at 50° C. In addition, the storage modulus of the elastic layer may be $5 \times 10^6$ Pa or more at 70° C. In addition, the storage modulus of the elastic layer may be $5 \times 10^6$ Pa or more at 90° C.

The elastic layer has a modulus lower than that of the base film. As an example, the ratio of the storage modulus of the elastic layer to the storage modulus of the base film (elastic layer/base film) may be 0.9 or less, for example, 0.5 to 0.9 at −30° C. As another example, the ratio of the storage modulus of the elastic layer to the storage modulus of the base film (elastic layer/base film) may be 0.5 or less, for example, 0.005 to 0.5 or 0.05 to 0.5 at 25° C. As another example, the ratio of the storage modulus of the elastic layer to the storage modulus of the base film (elastic layer/base film) may be 0.1 or less, for example, 0.001 to 0.1 or 0.001 to 0.05 at 50° C.

The composite film according to an embodiment may have a surface hardness that is appropriate to be applied as a cover window.

The surface hardness of the composite film may be measured by a nanoindentation test.

Nanoindentation is an analysis technique in which an indenter having a certain geometric shape is forced to the surface of a material with a small force (load) at a pN to mN level and then released to obtain a force-displacement curve, which is analyzed to measure various mechanical properties such as tensile properties and residual stress as well as hardness and elastic modulus.

The indenter tip may have a variety of geometric shapes. For example, it may have a conical, pyramidal or triangular pyramid (Berkovich triangular or Vickers triangular), cylindrical flat punch shape, or the like.

FIG. 4 shows before (a) and after (b) the indentation of a sample in a nanoindentation test. FIG. 5 shows a cross-sectional view of a sample at the time of indentation (a) and release (b) by an indenter tip.

Referring to FIGS. 4 and 5, since common polymer materials are viscoelastic, when a sample (10a) is indented by the tip (2a) in the lower end of an indenter (2), it is deformed to the maximum depth ($h_{max}$) at the maximum test force ($F_{max}$). Thereafter, when the indenter (2) is removed to release the indentation by the indenter tip (2a), the deformation is in part restored due to the elasticity of the polymer, whereas the rest is not permanently restored, thereby leaving a dent having a certain depth ($h_p$) (2b).

In this nanoindentation test, the stiffness (S), projected contact area ($A_p$), test force (F), maximum indentation depth ($h_{max}$) at maximum force ($F_{max}$), and the like are measured, and a force-displacement curve is obtained. Based on these results, the indentation modulus ($E_{IT}$), indentation hardness ($H_{IT}$), Vickers hardness ($H_V$), Martens hardness ($H_M$), indentation creep ($C_{IT}$), recovery relation ($\eta_{IT}$), and the like may be calculated. The nanoindentation test may be carried out according to, for example, the ISO 14577-1:2002(E) standard.

Vickers hardness ($H_V$) is calculated by multiplying indentation hardness ($H_{IT}$) by 0.0945 ($H_1 \times 0.0945$) and may be measured according to, for example, the ISO 14577-1:2002 (E) standard. Plastic properties such as ductility, malleability, and impact resistance may be obtained from the Vickers hardness ($H_V$). The composite film according to an embodiment may have a Vickers hardness ($H_V$) of, for example, 20 N/mm² or more, 25 N/mm² or more, or 30 N/mm² or more, and 70 N/mm² or less, 50 N/mm² or less, or 40 N/mm² or less. As a specific example, the composite film may have a Vickers hardness ($H_V$) of 30 N/mm² or more, more specifically, 35 N/mm² to 70 N/mm², or 30 N/mm² to 40 N/mm², when measured for the surface of the hard coating layer by a nanoindentation test according to the ISO 14577-1:2002 (E) standard.

The high Vickers hardness ($H_V$) of the composite film according to an embodiment may be attributable to the elastic layer. For example, the composite film may have an $H_V$ increase (N/mm²), as calculated by the following equation, of 0.5 N/mm² or more, specifically, 1.0 N/mm² or more, 1.5 N/mm² or more, or 2.0 N/mm² or more, as a more specific example, 1 N/mm² to 10.0 N/mm² or 1.5 N/mm² to 5.0 N/mm².

$$H_V \text{increase}(N/mm^2) = H_V 1(N/mm^2) - H_V 2(N/mm^2)$$

Here, $H_V 1$ is the Vickers hardness ($H_V$) (N/mm²) of the composite film, and $H_V 2$ is the Vickers hardness ($H_V$) (N/mm²) of a film having a layer structure excluding the elastic layer from the composite film.

In addition, the Vickers hardness ($H_V$) of the surface of the elastic layer (single elastic layer) according to an embodiment may be 0.3 N/mm² or more, more specifically, 0.3 N/mm² to 5 N/mm² or 0.3 N/mm² to 3.5 N/mm².

Indentation hardness ($H_{IT}$) is also called plastic hardness, which is a measure of the resistance of a material to permanent (plastic) deformation at maximum force. Plastic properties such as ductility, malleability, and impact resistance can be obtained therefrom. Specifically, the indentation hardness ($H_{IT}$) is calculated as a value ($F_{max}/A_p$) of the maximum test force ($F_{max}$) divided by the projected contact area ($A_p$) at the penetration depth. The composite film according to an embodiment may have an indentation hardness ($H_{IT}$) of, for example, 250 N/mm² or more, 300 N/mm² or more, 310 N/mm² or more, 320 N/mm² or more, 325 N/mm² or more, 327 N/mm² or more, 328 N/mm² or more, 329 N/mm² or more, or 330 N/mm² or more, and 700 N/mm² or less, 500 N/mm² or less, 400 N/mm² or less, or 350 N/mm² or less. As a specific example, the composite film may have an indentation hardness ($H_{IT}$) of 327 N/mm² or more, more specifically, 327 N/mm² to 500 N/mm² or 327 N/mm² to 400 N/mm², when measured for the surface of the hard coating layer by a nanoindentation test according to the ISO 14577-1:2002(E) standard.

The high indentation hardness ($H_{IT}$) of the composite film according to an embodiment may be attributable to the elastic layer. For example, the composite film may have an $H_{IT}$ increase (N/mm²), as calculated by the following equation, of 5 N/mm² or more, specifically, 10 N/mm² or more or 15 N/mm² or more, as a specific example, 5 N/mm² to 50 N/mm² or 10 N/mm² to 30 N/mm².

$$H_{IT} \text{increase}(N/mm^2) = H_{IT} 1(N/mm^2) - H_{IT} 2(N/mm^2)$$

Here, $H_{IT} 1$ is the indentation hardness ($H_{IT}$) (N/mm²) of the composite film, and $H_{IT} 2$ is the indentation hardness ($H_{IT}$) (N/mm²) of a film having a layer structure excluding the elastic layer from the composite film.

In addition, the indentation hardness ($H_{IT}$) of the elastic layer according to an embodiment may be 2.5 N/mm² to 50 N/mm², 2.5 N/mm² to 40 N/mm², or 3 N/mm² to 35 N/mm².

Indentation modulus ($E_{IT}$) may be calculated using the Poisson's ratio of a sample and an indenter, the modulus of the indenter, and the reduced modulus of the indentation contact, which may be measured by a nanoindentation test according to, for example, the ISO 14577-1:2002(E) standard. Elastic properties such as degree of hardness and abrasion resistance may be obtained from the indentation modulus ($E_{IT}$).

The indentation modulus ($E_{IT}$) of the composite film according to an embodiment may be, for example, 2,500 MPa or more, 2,800 MPa or more, 2,900 MPa or more, 2,935 MPa or more, or 2,950 MPa or more, and 4,000 MPa or less, 3,500 MPa or less, 3,300 MPa or less, or 3,100 MPa or less. As a specific example, the composite film may have an indentation modulus ($E_{IT}$) of 2,700 MPa or more, more specifically, 2,700 MPa to 4,000 MPa, when measured for the surface of the hard coating layer by a nanoindentation test according to the ISO 14577-1:2002(E) standard.

In addition, the indentation modulus ($E_{IT}$) of the elastic layer according to an embodiment may be 50 MPa to 2,000 MPa, 100 MPa to 1,500 MPa, or 1,000 MPa to 1,500 MPa.

Recovery relation ($\eta_{IT}$) may be calculated as a percentage ($W_{elast}/W_{total}$) 100, %) of the elastic reserve deformation work ($W_{elast}$) to the total mechanical work of indentation ($W_{total}$) in a force-depth curve obtained by the indentation of an indenter onto a sample surface and then release thereof, which may be measured according to, for example, the ISO 14577-1:2002(E) standard. The recovery relation ($\eta_{IT}$) of the composite film according to an embodiment may be, for example, 50% or more, 55% or more, 60% or more, 61% or more, 62% or more, or 63% or more, and 85% or less, 80% or less, 75% or less, or 70% or less. As a specific example, the composite film may have a recovery relation ($\eta_{IT}$) of 61% or more, more specifically, 61% to 70% or 61% to 65%, when measured for the surface of the hard coating layer by a nanoindentation test according to the ISO 14577-1:2002 (E) standard.

In addition, the recovery relation ($\eta_{IT}$) of the elastic layer according to an embodiment may be 15% to 45%, 20% to 35%, or 20% to 30%.

Indentation creep ($C_{IT}$) describes further deformation of a material at constant force. In order to measure indentation creep ($C_{IT}$), an indenter is pressed onto a sample at a constant force over a longer period of time (minutes to hours). It may be calculated by measuring the indentation depth increased by the continued pressing. The indentation creep ($C_{IT}$) of the composite film according to an embodiment may be, for example, 3.0% or more, 3.5% or more, 4.0% or more, or 4.3% or more, and 7.0% or less, 6.5% or less, 6.0% or less, 5.0% or less, 4.7% or less, 4.6% or less, or 4.5% or less. As a specific example, the composite film may have an indentation creep ($C_{IT}$) of 4.0% or more, more specifically, 4.0% to 5.5% or 4.0% to 5.0%, when measured for the surface of the hard coating layer by a nanoindentation test according to the ISO 14577-1:2002(E) standard.

In addition, the indentation creep ($C_{IT}$) of the elastic layer according to an embodiment may be 5% to 20%, 5% to 15%, 7% to 15%, or 10% to 13%.

Recovery may be calculated by the following equation based on the values measured by a nanoindentation test. The recovery of the composite film according to an embodiment may be, for example, 60% or more, 65% or more, 69% or more, 70% or more, or 71% or more, and 90% or less, 85% or less, 80% or less, or 75% or less. As a specific example, the composite film may have a recovery of 69% or more, more specifically, 70% to 90% or 70% to 80%, when measured for the surface of the hard coating layer by a nanoindentation test according to the ISO 14577-1:2002(E) standard. The recovery may be calculated by the following equation.

$$\text{Recovery}(\%) = [(h_{max} - h_p)/h_{max}] \times 100$$

Here, $h_{max}$ is the maximum indentation depth (μm) during which the surface of the hard coating layer is pressed downward for 1:5 seconds at a force of 30 r N and held for 5 seconds, and $h_p$ is the depth (μm) of the indentation that remains unrecovered even after the force is released.

The high recovery of the composite film according to an embodiment may be attributable to the elastic layer. For example, the composite film may have a recovery increase (%), as calculated by the following equation, of 0.5% or more, specifically, 1.0% or more, 1.5% or more, or 1.6% or more, as a specific example, 0.5% to 5%, 0.5% to 3%, or 1% to 3%.

Recovery increase(%)=Recovery1(%)−Recovery2(%)

Here, Recovery1 is the recovery (%) of the composite film, and Recovery2 is the recovery (%) of a film having a layer structure excluding the elastic layer from the composite film.

In addition, the recovery of the elastic layer according to an embodiment may be 25% to 55%, 30% to 50%, 35% to 50%, or 35% to 45%.

According to an embodiment, the HV increase (N/mm²) calculated according to the above equation may be 2.0 N/mm² or more, and the recovery increase (%) calculated according to the above equation may be 1.5% or more.

The composite film according to an embodiment may have a light transmittance, for example, an average visible light transmittance of at least a certain level. As a result, it is advantageous to be applied to a cover window of a display device. For example, the film may have a light transmittance of 70% or more, 75% or more, 80% or more, 82% or more, 83% or more, 85% or more, or 90% or more. Meanwhile, the upper limit of the light transmittance range of the film is not particularly limited. It may be, for example, 100% or less, 98% or less, 95% or less, or 90% or less. The transmittance may be measured, for example, according to the ASTM D1003 standard.

In addition, the composite film according to an embodiment may have a haze of a certain level or less. As a result, it is advantageous to be applied to a cover window of a display device. For example, the film may have a haze of 5% or less, 4% or less, 3.5% or less, 3% or less, 2% or less, or 1.5% or less. Meanwhile, the lower limit of the haze range of the film is not particularly limited. It may be, for example, 0% or more, 0.5% or more, or 1% or more. The haze may be measured, for example, according to the ASTM D1003 standard.

As a specific example, the composite film may have a light transmittance of 90% or more and a haze of 1.5% or less.

Elastic Layer

The elastic layer is formed on the opposite side to the hard coating layer and serves as an impact-resistant layer through the controlling of modulus, whereby it is possible to enhance the surface hardness and recovery of the hard coating layer.

The elastic layer may comprise an organic resin. The organic resin may comprise a curable resin, specifically, a thermosetting resin or a UV curable resin. Accordingly, the elastic layer may be a curable coating layer. The organic resin may serve as a binder. In particular, the organic resin may comprise an elastomer.

As an example, the elastic layer may comprise an acrylate-based binder. The content of the acrylate-based binder may be 30 to 98% by weight based on the weight of the elastic layer. Specifically, the content of the acrylate-based binder may be 40 to 95% by weight or 50 to 90% by weight, based on the weight of the elastic layer.

As a specific example, the acrylate-based binder may comprise a urethane acrylate-based compound.

The urethane acrylate-based compound may comprise a urethane bond as a repeat unit and may have a plurality of functional groups.

The urethane acrylate-based compound may be one in which a terminal of a urethane compound formed by reacting a diisocyanate compound with a polyol is substituted with an acrylate group. For example, the diisocyanate compound may comprise at least one of a linear, branched, or cyclic aliphatic diisocyanate compound having 4 to 12 carbon atoms and an aromatic diisocyanate compound having 6 to 20 carbon atoms. The polyol comprises 2 to 4 hydroxyl (—OH) groups and may be a linear, branched, or cyclic aliphatic polyol compound having 4 to 12 carbon atoms or an aromatic polyol compound having 6 to 20 carbon atoms. The terminal substitution with an acrylate group may be carried out by an acrylate-based compound having a functional group capable of reacting with an isocyanate group (NCO). For example, an acrylate-based compound having a hydroxyl group or an amine group may be used, and a hydroxyalkyl acrylate or aminoalkyl acrylate having 2 to 10 carbon atoms may be used.

The number of functional groups of the urethane acrylate-based compound may be 1 or more, 2 or more, 3 or more, or 4 or more, and 15 or less, 12 or less, 9 or less, 7 or less, 6 or less, 5 or less, or 4 or less. As a specific example, the number of functional groups of the urethane acrylate-based compound may be 2 to 12, 2 to 10, or 2 to 8.

The urethane acrylate-based compound may be an oligomer. As a specific example, the elastic layer may comprise a UV-curable urethane acrylate-based oligomer having 2 to 8 functional groups.

The urethane acrylate-based compound may have a weight average molecular weight of 1,000 or more, 500 or more, 2,000 or more, 2,500 or more, 3,000 or more, 3,500 or more, or 4,000 or more, and 50,000 or less, 30,000 or less, 20,000 or less, 10,000 or less, 7,000 or less, or 5,000 or less.

The urethane acrylate-based compound may have a glass transition temperature (Tg) of −80° C. or higher, −70° C. or higher, −60° C. or higher, −50° C. or higher, −40° C. or higher, or −30° C. or higher, and 100° C. or lower, 90° C. or lower, 80° C. or lower, 70° C. or lower, 60° C. or lower, or 50° C. or lower. As a specific example, the urethane acrylate-based compound may have a glass transition temperature (Tg) of −80° C. to 100° C.-80° C. to 90° C., −80° C. to 80° C., −80° C. to 70° C., −80° C. to 60° C., −70° C. to 100° C., −70° C. to 90° C., −70° C. to 80° C., −70° C. to 70° C., −70° C. to 60° C., −60° C. to 100° C., −60° C. to 90° C., 60° C. to 80° C., −60° C. to 70° C., −60° C. to 60° C., 50° C. to 100° C., 50° C. to 90° C., 50° C. to 80° C., 50° C. to 70° C., or −50° C. to 60° C.

The elastic layer may further comprise a photoinitiator. Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, examples of commercially available photoinitiators include Irgacure™ 184, Irgacure™ 500, Irgacure™ 651, Irgacure™ 369, Irgacure™ 907, Darocur™ 1173, Darocur™ MBF, Irgacure™ 819, Darocur™ TPO, Irgacure™ 907, and Esacure™ KIP 100F. The photoinitiator may be used alone or in combination of two or more different types. For example, the content of the photoinitiator may be 0.01% by weight to 10% by weight based on the total weight of the elastic layer, but it is not limited thereto.

The elastic layer may have a thickness of 2 μm or more, 3 μm or more, 5 μm or more, 10 μm or more, or 20 μm or more, and 100 μm or less, 80 μm or less, 50 μm or less, or 30 μm or less. For example, the thickness of the elastic layer may be 5 μm to 100 μm, Specifically, the thickness of the elastic layer may be 10 μm to 100 μm. More specifically, the thickness of the elastic layer may be 30 μm to 80 μm.

As a specific example, the thickness of the base film may be 40 μm to 200 μm, the thickness of the hard coating layer may be 2 μm to 20 μm, and the thickness of the elastic layer may be 10 μm to 100 μm.

The elastic layer may be directly formed on the surface of the base film. Specifically, another layer may not be present between the elastic layer and the base film. In addition, any one of both sides of the elastic layer may be provided as an interface between the elastic layer and the base film.

The elastic layer may be formed by applying an elastic coating composition on the base film, followed by drying and curing thereof.

The elastic coating composition may comprise an additive such as a photoinitiator and a solvent, together with the acrylate-based binder described above.

Examples of the solvent include alcohol-based solvents such as methanol, ethanol, isopropyl alcohol, and butanol, alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethylene glycol monopropyl ether, &ethylene glycol monobutyl ether, and diethylene glycol-2-ethylhexyl ether; and aromatic solvents such as benzene, toluene, and xylene. Which may be used alone or in combination thereof.

The content of the solvent is not particularly limited since it may be variously adjusted within a range that does not impair the physical properties of the coating composition. It may be employed such that the weight ratio of the solids content of the components contained in the elastic coating composition to the solvent may be 20:80 to 99:1, 30:70 to 70:30, or 40:60 to 60:40, if the content of the solvent is within the above range, the composition may have appropriate flowability and coatability.

The elastic coating composition may be applied through bar coating, knife coating, roll coating, blade coating, die coating, micro gravure coating, comma coating, slot die coating, lip coating, solution casting, or the like.

Thereafter, the solvent contained in the elastic coating composition may be removed through a drying step. The drying step may be carried out at a temperature of 40° C. to 100° C., preferably 40° C. to 80° C., 50° C. to 100° C., or 50° C. to 80° C., for about 1 minute to 20 minutes, preferably 1 minute to 10 minutes or 1 minute to 5 minutes.

Thereafter, the elastic layer may be cured by light and/or heat. As an example, the elastic layer may be cured by irradiating UV light at a dose of 0.5 J/cm² to 1.5 J/cm² under a nitrogen atmosphere.

Hard Coating Layer

The hard coating layer is disposed on one side of the base film.

The hard coating layer may have an upper side and a lower side, of which the lower side may face the base film, and the upper side may be the outermost side exposed to the outside. In addition, the lower side of the hard coating layer may be in direct contact with one side of the base film or may be bonded to one side of the base film through an additional coating layer.

As an example, the hard coating layer may be directly formed on one side of the base film. As another example, the hard coating layer may be bonded to one side of the base film through a primer coating layer that is additionally formed on the surface of the base film.

The hard coating layer may enhance the mechanical properties and/or optical properties of the composite film. In addition, the hard coating layer may further comprise anti-glare, antifouling, antistatic functions, and the like.

The hard coating layer may comprise at least one of an organic component, an inorganic component, and an organic-inorganic composite component as a hard coating agent.

As an example, the hard coating layer may comprise an organic resin. Specifically, the organic resin may be a curable resin. Accordingly, the hard coating layer may be a curable coating layer. In addition, the organic resin may be a binder resin.

Specifically, the hard coating layer may comprise at least one selected from the group consisting of a urethane acrylate-based compound, an acrylic ester-based compound, and an epoxy acrylate-based compound. More specifically, the hard coating layer may comprise a urethane acrylate-based compound and an acrylic ester-based compound, but it is not limited thereto.

The urethane acrylate-based compound may comprise a urethane bond as a repeat unit and may have a plurality of functional groups.

The urethane acrylate-based compound may be one in which a terminal of a urethane compound formed by reacting a diisocyanate compound with a polyol is substituted with an acrylate group. For example, the diisocya]nate compound may comprise at least one of a linear, branched, or cyclic aliphatic diisocyanate compound having 4 to 12 carbon atoms and an aromatic diisocyanate compound having 6 to 20 carbon atoms. The polyol comprises 2 to 4 hydroxyl (—OH) groups and may be a linear, branched, or cyclic aliphatic polyol compound having 4 to 12 carbon atoms or an aromatic polyol compound having 6 to 20 carbon atoms. The terminal substitution with an acrylate group may be carried out by an acrylate-based compound having a functional group capable of reacting with an isocyanate group (—NCO). For example, an acrylate-based compound having a hydroxyl group or an amine group may be used, and a hydroxyalkyl acrylate or aminoalkyl acrylate having 2 to 10 carbon atoms may be used.

The number of functional groups of the urethane acrylate-based compound may be 2 or more, 5 or more, 7 or more, or 9 or more, and 18 or less, 15 or less, 12 or less, or 10 or less. As a specific example, the number of functional groups of the urethane acrylate-based compound may be 2 to 18, 5 to 18, or 9 to 15.

The urethane acrylate-based compound may have a weight average molecular weight of 1,500 or more, 2,500 or more, 3,500 or more, or 5,000 or more, and 50,000 or less, 30,000 or less, 20,000 or less, 10,000 or less, or 7,000 or less.

The urethane acrylate-based compound may have a glass transition temperature (Tg) of −80° C. to 100° C., −80° C. to 90° C.-80° C. to 80° C., −80° C. to 70° C., −80° C. to 60° C., −70° C. to 100° C., −70° C. to 90° C., −70° C. to 80° C., −70° C. to 70° C., −70° C. to 60° C., −60° C. to 100° C., −60° C. to 90° C., −60° C. to 80° C., −60° C. to 70° C., −60° C. to 60° C., −50° C. to 100° C., −50° C. to 90° C., −50° C. to 80° C., −50° C. to 70° C., or −50° C. to 60° C.

The acrylic ester-based compound may be at least one selected from the group consisting of a substituted or unsubstituted acrylate and a substituted or unsubstituted methacrylate. The acrylic ester-based compound may contain 1 to 10 functional groups.

Examples of the acrylic ester-based compound include trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA), but it is not limited thereto.

The acrylic ester-based compound may have a weight average molecular weight of 500 to 6,000, 500 to 5,000, 500 to 4,000, 1,000 to 6,000, 1,000 to 5,000, 1,000 to 4,000, 1500 to 6,000, 1,500 to 5,000, or 1,500 to 4,000. The acrylic ester-based compound may have an acrylate equivalent of 50 g/eq. to 300 g/eq., 50 g/eq. to 200 g/eq., or 50 g/eq. to 150 g/eq.

The epoxy acrylate-based compound may contain 1 to 10 functional groups. Examples of the epoxy acrylate-based compound include a monofunctional epoxy acrylate oligomer having a weight average molecular weight of 100 to 300, a bifunctional epoxy acrylate oligomer having a weight average molecular weight of 250 to 2,000, and a tetrafunctional epoxy acrylate oligomer having a weight average molecular weight of 1,000 to 3,000, but it is not limited thereto. The epoxy acrylate-based compound may have an epoxy equivalent of 50 g/eq. to 300 g/eq., 50 g/eq. to 200 g/eq., or 50 g/eq. to 150 g/eq.

The content of the organic resin may be 30 to 100% by weight based on the total weight of the hard coating layer. Specifically, the content of the organic resin may be 40 to 90% by weight, or 50 to 80% by weight, based on the total weight of the hard coating layer.

The hard coating layer may further comprise a photoinitiator. Examples of the photoinitiator include 1-hydroxycyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, commercially available products include Irgacure™ 184, Irgacure™ 500, Irgacure™ 651, Irgacure™ 369, Irgacure™ 907, Darocur™ 1173, Darocur™ MBF, Irgacure™ 819, Darocur™ TPO, Irgacure™ 907, and Esacure™ KIP 100F. The photoinitiator may be used alone or in combination of two or more different types.

The hard coating layer may further comprise an antifouling agent. For example, the hard coating layer may comprise a fluorine-based compound. The fluorine-based compound may have an antifouling function. Specifically, the fluorine-based compound may be an acrylate-based compound having a perfluoro-alkyl group. Specific examples thereof may include perfluorohexylethyl acrylate, but it is not limited thereto.

The hard coating layer may further comprise an antistatic agent. The antistatic agent may comprise an ionic surfactant. For example, the ionic surfactant may comprise an ammonium salt or a quaternary alkylammonium salt, and the ammonium salt and the quaternary alkylammonium salt may comprise a halide such as a chloride or a bromide.

In addition, the hard coating layer may further comprise additives such as surfactants, UV absorbers, UV stabilizers, anti-yellowing agents, leveling agents, and dyes to improve color values. For example, the surfactant may be a monofunctional to bifunctional fluorine-based acrylate, a fluorine-based surfactant, or a silicone-based surfactant. The surfactant may be employed in a form dispersed or crosslinked in the hard coating layer. In addition, examples of the UV absorber include benzophenone-based compounds, benzotriazole-based compounds, and triazine-based compounds. Examples of the UV stabilizer include tetramethyl piperidine and the like. The content of the additives may be variously adjusted within a range that does not impair the physical properties of the hard coating layer. For example, the content of the additives may be 0.01 to 10% by weight based on the weight of the hard coating layer, but it is not limited thereto.

The hard coating layer may have a thickness of 2 μm or more, 3 μm or more, 5 μm or more, or 10 μm or more, and 50 μm or less, 30 μm or less, 20 μm or less, or 10 μm or less. For example, the thickness of the hard coating layer may be 2 μm to 20 μm. Specifically, the thickness of the hard coating layer may be 5 μm to 20 μm. If the thickness of the hard coating layer is too thin, it may not have sufficient surface hardness to protect the base film, so that the durability of the composite film may be deteriorated. If it is too thick, the flexibility of the composite film may be deteriorated, and the overall thickness of the composite film may be increased, which may be disadvantageous for forming a thin film.

Accordingly, the hard coating layer may be formed from a hard coating composition comprising at least one of an organic-based composition, an inorganic-based composition, and an organic-inorganic composite composition. For example, the hard coating composition may comprise at least one of an acrylate-based compound, a siloxane compound, and a silsesquioxane compound. In addition, the hard coating layer may further comprise inorganic particles. As a specific example, the hard coating layer may be formed from a hard coating composition comprising a urethane acrylate-based compound, an acrylic ester-based compound, and a fluorine-based compound.

The hard coating layer may be formed by applying a hard coating composition on the base film, followed by drying and curing thereof.

The hard coating composition may comprise the organic resin, photoinitiator, antifouling agent, antistatic agent, other additives and/or solvents described above.

Examples of the solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the solvent is not particularly limited since it may be variously adjusted within a range that does not impair the physical properties of the coating composition. It may be employed such that the weight ratio of the solids content of the components contained in the hard coating composition to the solvent may be 30:70 to 99:1 or 30:70 to 70:30. If the content of the solvent is within the above range, the composition may have appropriate flowability and coatability.

The hard coating composition may comprise 10 to 30% by weight of an organic resin, 0.1 to 5% by weight of a photoinitiator, 0.01 to 2% by weight of an antifouling agent, and 0.1 to 10% by weight of an antistatic agent. According to the composition, the mechanical properties and antifouling and antistatic characteristics of the hard coating layer may be enhanced together.

The hard coating composition may be coated on the base film by a bar coating method, a knife coating method, a roll coating method, a blade coating method, a die coating method, a microgravure coating method, a comma coating method, a slot die coating method, a lip coating method, or a solution casting method.

Thereafter, the solvent contained in the hard coating composition may be removed through a drying step. The drying step may be carried out at a temperature of 40° C. to 100° C. preferably 40° C. to 80° C. 50° C. to 100° C., or 50° C. to 80° C., for about 1 minute to 20 minutes, preferably 1 minute to 10 minutes or 1 minute to 5 minutes.

Thereafter, the hard coating composition may be cured by light and/or heat. As an example, the hard coating composition may be cured by irradiating UV light at a dose of 0.5 J/cm² to 1.5 J/cm².

Base Film

The base film serves as a base layer of the hard coating layer while imparting mechanical properties to the composite film.

The base film may be a polymer film or a glass substrate, specifically, a reinforced glass substrate with a thickness of less than about 100 μm. For example, the base film may comprise at least one selected from the group consisting of a polymer film or ultra-thin glass (UTG).

Specifically, the base film may be a polymer film. That is, the base film may comprise a polymer resin.

According to an embodiment, the base film comprises a polyester resin. For example, the base film may be a transparent polyester-based film.

The polyester-based resin may be a homopolymer resin or a copolymer resin in which a dicarboxylic acid and a diol are polycondensed. In addition, the polyester-based resin may be a blend resin in which the homopolymer resins or the copolymer resins are mixed.

Examples of the dicarboxylic acid include terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, trimethyladipic acid, pimelic acid, azelaic acid, sebacic acid, suberic acid, dodecadicarboxylic acid, and the like.

In addition, examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butan diol, 1,5-pentanediol, 1,6-hexanediol, 2,2-bis(4-hydroxyphenyl)propane, bis(4-hydroxyphenyl)sulfone, and the like.

Preferably, the polyester-based resin may be an aromatic polyester-based resin having excellent crystallinity. For example, it may have a polyethylene terephthalate (PET) resin as a main component.

The polyester-based film may comprise a polyester-based resin, specifically a PET resin, in an amount of at least about 85% by weight, more specifically 90% by weight or more, 95% by weight or more, or 99% by weight or more. As another example, the polyester-based film may further comprise a polyester-based resin other than the PET resin. Specifically, the polyester-based film may further comprise up to about 15% by weight of a polyethylene naphthalate (PEN) resin, More specifically, the polyester-based film may further comprise a PEN resin in an amount of about 0.1% by weight to 10% by weight or about 0.1% by weight to 5% by weight.

The polyester-based film having the above composition may have increased crystallinity and enhanced mechanical properties in terms of tensile strength and the like in the process of preparing the same through heating, stretching, and the like.

The process for preparing a polyester-based film may comprise (1) extruding a composition comprising a polyester resin to obtain an unstretched film; (2) stretching the unstretched film in the longitudinal direction and in the transverse direction; and (3) heat-setting the stretched film.

In the above preparation process, the polyester-based film is prepared by extruding a raw resin and subjecting it to preheating, stretching, and heat setting. In such an event, the composition of the polyester resin used as a raw material of the polyester-based film is as exemplified above. In addition, the extrusion may be carried out at a temperature of 230° C. to 300° C. or 250° C. to 280° C.

The polyester-based film is preheated at a certain temperature before stretching thereof. The preheating temperature satisfies the range of Tg+5° C. to Tg+50° C. based on the glass transition temperature (Tg) of the polyester resin, and it is determined to satisfy the range of 70° C. to 90° C. at the same time. Within the above range, the polyester-based film may be soft enough to be readily stretched, and it is possible to effectively prevent the phenomenon of breakage during stretching thereof as well.

The stretching is carried out by biaxial stretching. For example, it may be carried out in the transverse direction (or tenter direction, TD) and in the longitudinal direction (or machine direction, MD) through a simultaneous biaxial stretching method or a sequential biaxial stretching method. Preferably, it may be carried out by a sequential biaxial stretching method in which stretching is first performed in one direction, and then stretching is performed in the direction perpendicular thereto.

The stretching ratio in the longitudinal direction may be in a range of 2.0 to 5.0, more specifically 2.8 to 3.5. In addition, the stretching ratio in the transverse direction may be in a range of 2.0 to 5.0, more specifically 2.9 to 3.7, Preferably, the longitudinal stretch ratio (d1) and the transverse stretch ratio (d2) are similar to each other. Specifically, the ratio (d2/d1) of the stretching ratio (d2) in the longitudinal direction to the stretching ratio (d1) in the transverse direction may be 0.5 to 1.0, 0.7 to 1.0, or 0.9 to 1.0. The stretching ratios (d1 and d2) refer to the ratios that represent the length after stretching as compared with the length before stretching being 1.0. In addition, the stretching speed may be 6.5 m/minute to 8.5 m/minute, but it is not particularly limited thereto.

The stretched sheet may be heat-set at 150° C. to 250° C., more specifically 160° C. to 230° C. The heat setting may be carried out for 5 seconds to 1 minute, more specifically for 10 seconds to 45 seconds.

After the heat setting is initiated, the sheet may be relaxed in the longitudinal direction and/or in the transverse direction, and the temperature range therefor may be 150° C. to 250° C.

According to another embodiment, the base film comprises a polyimide-based resin or a polyamide-based resin. Specifically, the base film may be a transparent polyimide-based or polyamide-based film.

The polyimide-based resin may be prepared by simultaneously or sequentially reacting reactants that comprise a diamine compound and a dianhydride compound. Specifically, the polyimide-based resin may comprise a polyimide-based polymer prepared by polymerizing a diamine compound and a dianhydride compound. The polyimide-based resin may comprise an imide repeat unit derived from the polymerization of a diamine compound and a dianhydride compound. In addition, the polyimide-based resin may be polymerized by further comprising a dicarbonyl compound. As a result, it may comprise a polyamide-imide-based polymer that further comprises an amide repeat unit derived from the polymerization of a diamine compound and a dicarbonyl compound.

The diamine compound is not particularly limited, but it may be, for example, an aromatic diamine compound that contains an aromatic structure. For example, the diamine compound may be a compound represented by the following Formula 1.

$$H_2N-(E)_e-NH_2 \quad \text{[Formula 1]}$$

In Formula 1, E is selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —S—, —C(=O)—, —CH(OH)—, —S(=O)$_2$—, —Si(CH$_3$)$_2$—, —C(CH$_3$)$_2$—, and —C(CF$_3$)$_2$—. e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

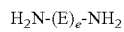
1-1a

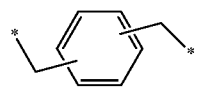
1-2a

1-3a

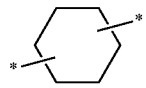
1-4a

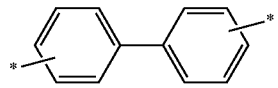
1-5a

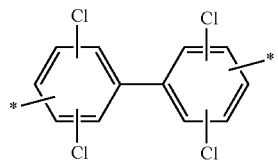
1-6a

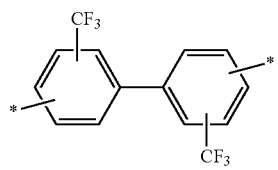
1-7a

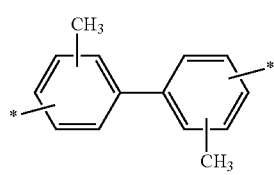
1-8a

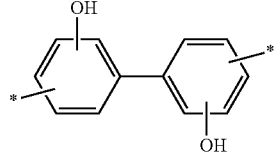
1-9a

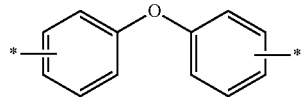
1-10a

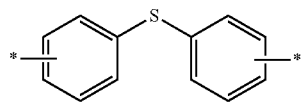
1-11a

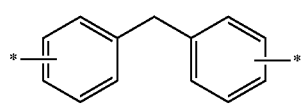
1-12a

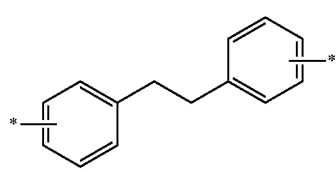
1-13a $$*-(CH_2)_n-*$$
1-14a (n is selected from integers of 1 to 12)

Specifically, $(E)_e$ in Formula 1 may be selected from the groups represented by the following Formulae 1-1b to 1-13b, but it is not limited thereto.

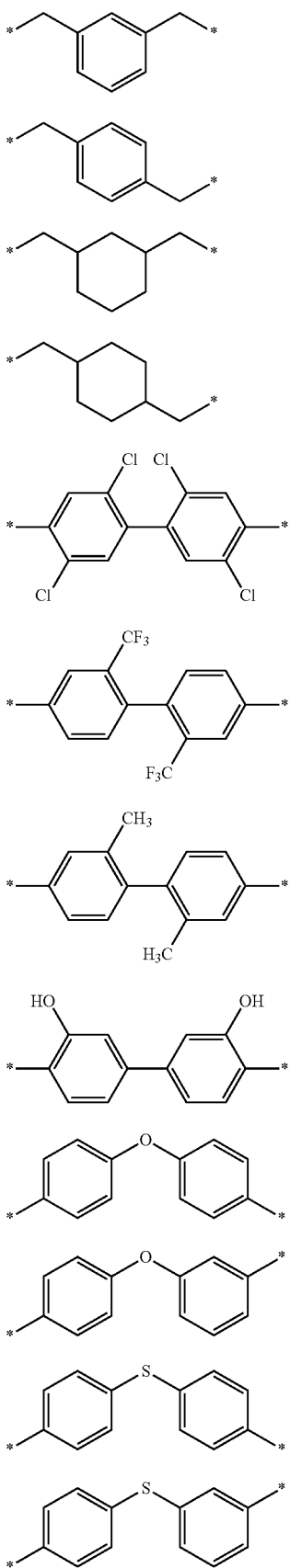

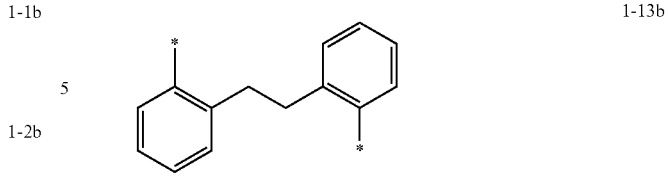

More specifically, $(E)_e$ in the above Formula 1 may be the group represented by the above Formula 1-6b.

In an embodiment, the diamine compound may comprise a compound having a fluorine-containing substituent. Alternatively, the diamine compound may be composed of a compound having a fluorine-containing substituent. In such an event, the fluorine-containing substituent may be a fluorinated hydrocarbon group and specifically may be a trifluoromethyl group. But it is not limited thereto.

In an embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

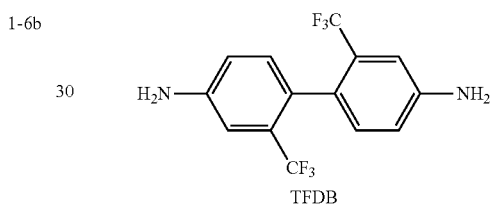

TFDB

The dianhydride compound has a low birefringence value, so that it can contribute to enhancements in the optical properties such as transmittance of a film that comprises the polyimide-based resin.

The dianhydride compound is not particularly limited, but it may be an aromatic dianhydride compound that contains an aromatic structure. For example, the aromatic dianhydride compound may be a compound represented by the following Formula 2.

[Formula 2]

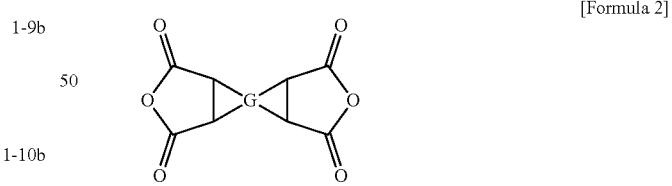

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

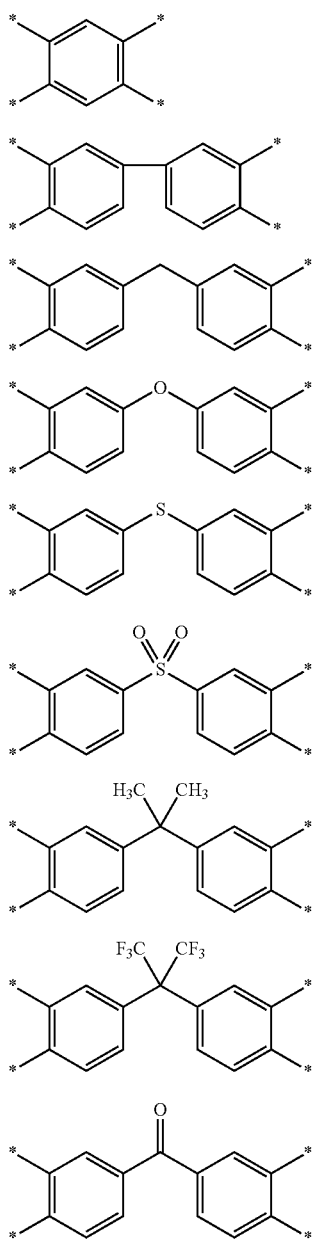

2-1a
2-2a
2-3a
2-4a
2-5a
2-6a
2-7a
2-8a
2-9a

For example, G in the above Formula 2 may be the group represented by the above Formula 2-8a.

In an embodiment, the dianhydride compound may comprise a compound having a fluorine-containing substituent. Alternatively, the dianhydride compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6-FDA) represented by the following formula, but it is not limited thereto.

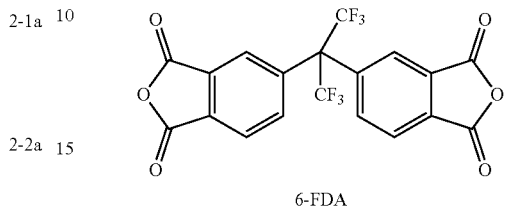

6-FDA

The diamine compound and the dianhydride compound may be polymerized to form a polyamic acid.

Subsequently, the polyamic acid may be converted to a polyimide through a dehydration reaction. The polyimide may comprise a repeat unit represented by the following Formula A.

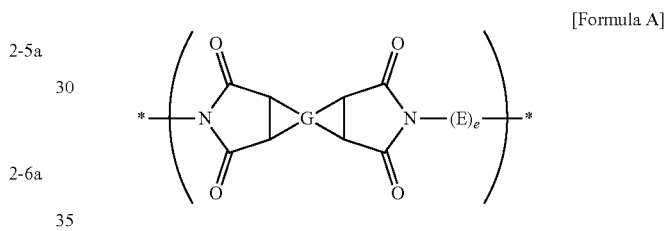

[Formula A]

In Formula A, E, G, and e are as described above.

For example, the polyimide may comprise a repeat unit represented by the following Formula A-1, but it is not limited thereto.

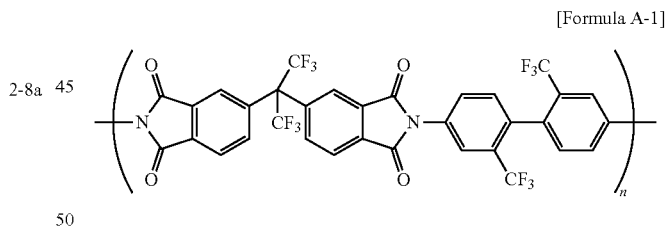

[Formula A-1]

In Formula A-1, n may be an integer of 1 to 400.

The dicarbonyl compound is not particularly limited, but it may be, for example, a compound represented by the following Formula 3.

[Formula 3]

In Formula 3, J is selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent C₄-C₃₀ heteroaromatic cyclic group, a substituted or unsubstituted C₁-C₃₀ alkylene group, a substituted or unsubstituted C₂-C₃₀ alkenylene group, a substituted or unsubstituted C₂-C₃₀ alkynylene group, —O—, —S—, —C(=O)—, —CH(OH)—, —S(=O)₂—, —Si(CH₃)₂—, —C(CH₃)₂—, and —C(CF₃)₂—, j is selected from integers of 1 to 5. When j is 2 or more, the is may be the same as, or different from, each other. X is a halogen atom. Specifically, X may be F, Cl, Br, I, or the like. More specifically, X may be Cl, but it is not limited thereto.

(J)_j in the above Formula 3 may be selected from the groups represented by the following Formulae 3-1a to 3-14a, but it is not limited thereto.

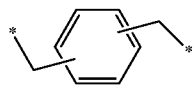

3-1a

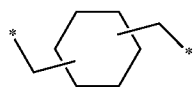

3-2a

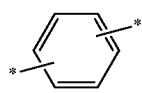

3-3a

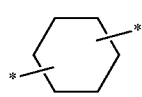

3-4a

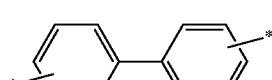

3-5a

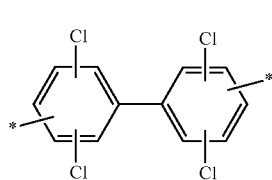

3-6a

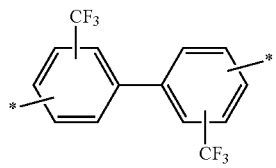

3-7a

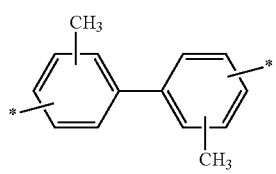

3-8a

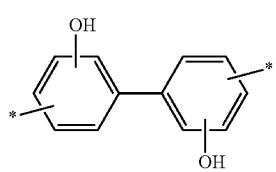

3-9a

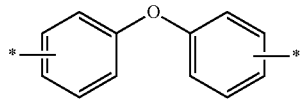

3-10a

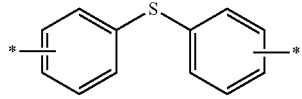

3-11a

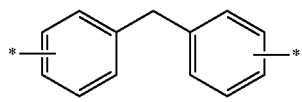

3-12a

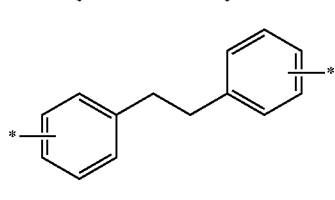

3-13a

*—(CH₂)ₙ—*

(n is selected from integers of 1 to 12)

3-14a

Specifically, (J)_j in the above Formula 3 may be selected from the groups represented by the following Formulae 3-1b to 3-8b, but it is not limited thereto.

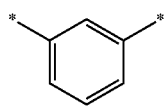

3-1b

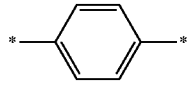

3-2b

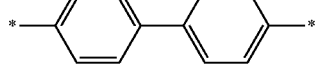

3-3b

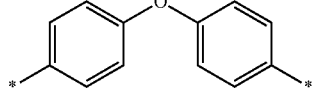

3-4b

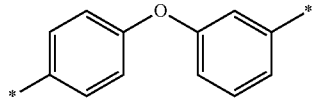

3-5b

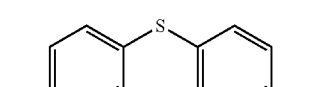

3-6b

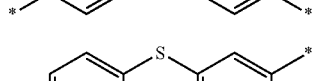

3-7b

*~~~~~~~~~*

3-8b

More specifically, $(J)_j$ in Formula 3 may be the group represented by the above Formula 3-1b, the group represented by the above Formula 3-2b, or the group represented by the above Formula 3-3b.

In an embodiment, a mixture of at least two kinds of dicarbonyl compounds different from each other may be used as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound different from the first dicarbonyl compound.

The first dicarbonyl compound and the second dicarbonyl compound may be an aromatic dicarbonyl compound, respectively.

The first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film thus produced that comprises the polyamide-imide resin.

The dicarbonyl compound may comprise terephthaloyl chloride (TPC), isophthaloyl chloride (IPC), and 1,1'-biphenyl-4,4'-dicarbonyl dichloride (BPDC), as represented by the following formulae, or a combination thereof. But it is not limited thereto.

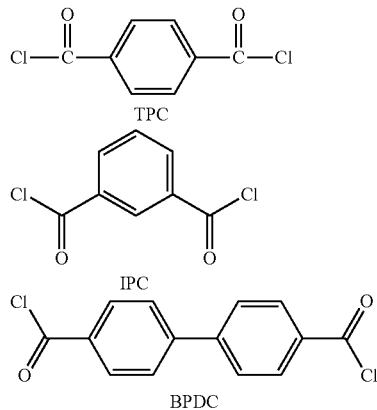

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-imide-based resin thus produced may have high oxidation resistance.

Alternatively, the first dicarbonyl compound may comprise IPC (isophthaloyl chloride), and the second dicarbonyl compound may comprise TPC, but they are not limited thereto.

Specifically, if IPC is used as the first dicarbonyl compound and TPC is used as the second dicarbonyl compound in a proper combination, a film that comprises the polyamide-imide-based resin thus produced may have high oxidation resistance, along with reduced manufacturing costs.

The diamine compound and the dicarbonyl compound may be polymerized to form a repeat unit represented by the following Formula B.

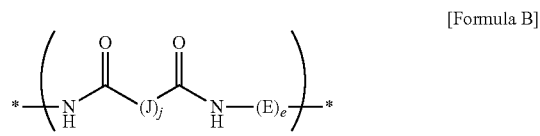

In Formula B, E, J, e, and j are as described above.

For example, the diamine compound and the dicarbonyl compound may be polymerized to form amide repeat units represented by the following Formulae B-1 and B-2.

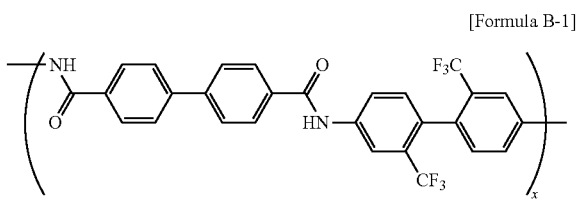

In Formula B-1, x is an integer of 1 to 400.

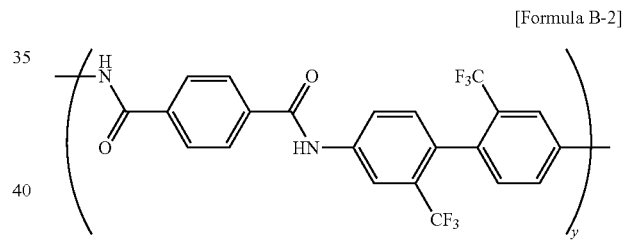

In Formula B-2, y is an integer of 1 to 400.

The base film may have a thickness of 20 μm or more, 30 μm or more, 40 μm or more, 50 μm or more, or 100 μm or more, and 500 μm or less, 400 μm or less, 300 μm or less, or 200 μm or less. As a specific example, the thickness of the base film may be 20 μm to 500 μm, more specifically 40 μm to 200 μm or 50 μm to 200 μm.

The base film may have a certain level of optical properties and mechanical properties.

The base film may have a haze of 3% or less. For example, the haze of the base film may be 2% or less, 1,5% or less, or 1% or less, but it is not limited thereto.

The base film may have a yellow index (YI) of 5 or less. For example, the yellow index of the base film may be 4 or less, 3.8 or less, 2.8 or less, 2.5 or less, 2.3 or less, or 2.1 or less, but it is not limited thereto.

The base film may have a storage modulus of $1 \times 10^9$ Pa to $3 \times 10^9$ Pa in a temperature range of $-50°$ C. to $90°$ C. Specifically, the storage modulus of the base film may be $1.5 \times 10^9$ Pa to $3 \times 10^9$ Pa, more specifically, $2 \times 10^9$ Pa to $3 \times 10^9$ Pa, in a temperature range of $-30°$ C. to $50°$ C., but it is not limited thereto.

The base film may have a transmittance of 80% or more. For example, the transmittance of the base film may be 85% or more, 88% or more, 89% or more, 80% to 99%, or 85% to 99%, but it is not limited thereto.

The base film may have a compressive strength of 0.4 kgf/μm or more. Specifically, the compressive strength of the base film may be 0.45 kgf/μm or more, or 0.46 kgf/μm or more, but it is not limited thereto.

The base film may have a surface hardness of HB or higher. Specifically, the surface hardness of the base film may be H or higher, or 2H or higher, but it is not limited thereto.

The base film may have a tensile strength of 15 kgf/mm$^2$ or more. Specifically, the tensile strength of the base film may be 18 kgf/mm$^2$ or more, 20 kgf/mm$^2$ or more, 21 kgf/mm$^2$ or more, or 22 kgf/mm$^2$ or more, but it is not limited thereto.

The base film may have an elongation of 15% or more. Specifically, the elongation of the base film may be 16% or more, 7% or more, or 17.5% or more, but it is not limited thereto.

MODE FOR THE INVENTION

The embodiments described below are provided to help understanding, and the scope of implementation is not limited thereto.

Preparation Example: Hard Coating Composition A

A hard coating composition was obtained by compounding in a composition shown in Table 1 below.

TABLE 1

| | Hard coating composition | % by weight |
| --- | --- | --- |
| Solvent | Isopropyl alcohol | 5.00 |
| | Ethanol | 32.50 |
| | Methyl isobutyl ketone | 25.00 |
| | Propylene glycol methyl ether | 12.50 |
| Organic resin | Urethane acrylate | 13.50 |
| | Acrylic ester | 9.12 |
| Photoinitiator | 1-Hydroxycyclohexyl phenyl ketone | 1.13 |
| Antifouling agent | (Perfluorohexy Dethyl acrylate | 0.11 |
| Antistatic agent | Quaternary ammonium chloride | 1.13 |

Urethane acrylate: Miramer MU9800 (Miwon Specialty Chemical)
Acrylic ester: Miramer PS3010 (Miwon Specialty Chemical)

Preparation Example: Elastic Coating Compositions A to E

Elastic coating compositions A to E were each obtained by compounding in a composition shown in Table 2 below. In each composition, urethane acrylate-based oligomers having functional groups and molecular weights as shown in Table 3 below were used as a binder.

TABLE 2

| | Elastic coating composition | % by weight |
| --- | --- | --- |
| Binder | One of urethane acrylate elastomers A to E | 47.6 |
| UV initiator | Irgacure 184, etc. | 2.4 |
| Solvent | Methyl ethyl ketone and methyl isobutyl ketone | 50.0 |

TABLE 3

| | Type of binder | No. of functional groups | Molecular weight |
| --- | --- | --- | --- |
| Elastic coating composition A | Urethane acrylate elastomer A | 3 | 2,800 |
| Elastic coating composition B | Urethane acrylate elastomer B | 5 | 4,600 |
| Elastic coating composition C | Urethane acrylate elastomer C | 3 | 4,000 |
| Elastic coating composition D | Urethane acrylate elastomer D | 3 | 22,000 |
| Elastic coating composition E | Urethane acrylate elastomer E | 3 | 8,000 |

Test Example 1: Modulus (Elastic Layer)

a. Sample: Elastic coating compositions A to E were each coated on the release surface of a release film to a thickness of 25 μm with a Mayer bar. Thereafter, it was thermally treated at 60° C. for 2 minutes to dry the solvent in the coating composition and irradiated with UV light at a dose of 1 J/cm$^2$ in a nitrogen atmosphere. It was then released from the release surface. The single elastic layer thus obtained having a thickness of 25 to 50 μm was cut to a length of 50 mm and a width of 10 min to prepare a sample.
b. Equipment: Manufacturer Hitachi, product name DMA 7100
c. Conditions
   DMA mode: tension mode
   Frequency: 1 Hz
   Dual cantilever clamp: both ends of the sample were clamped at a distance of about 20 mm
   Temperature ramp method: from −50° C. to 100° C. at 5° C./minute
d. Results: The storage modulus (Pa) of each sample according to the temperature measured under the above conditions is shown in Table 4 below and FIG. 3, In addition, ΔE' of the following equation was calculated and shown in Table 5 below. ΔE'=E'[−30° C.]/E'[50° C.]. Here, E'[−30° C.] is the storage modulus (Pa) of the elastic layer at −30° C., and E'[50° C.] is the storage modulus (Pa) of the elastic layer at 50° C.

TABLE 4

| | Storage modulus (Pa) of elastic layers | | | | |
| --- | --- | --- | --- | --- | --- |
| Temperature | Elastic coating Composition A | Elastic coating Composition B | Elastic coating Composition C | Elastic coating Composition D | Elastic coating Composition E |
| −30° C. | 2.10 × 10$^9$ | 2.10 × 10$^9$ | 2.30 × 10$^9$ | 1.80 × 10$^9$ | 1.80 × 10$^9$ |
| −10° C. | 1.90 × 10$^9$ | 1.80 × 10$^9$ | 2.00 × 10$^9$ | 1.50 × 10$^9$ | 1.70 × 10$^9$ |
| 10° C. | 1.50 × 10$^9$ | 4.10 × 10$^8$ | 7.80 × 10$^8$ | 2.10 × 10$^8$ | 9.30 × 10$^8$ |
| 25° C. | 6.50 × 10$^8$ | 1.90 × 10$^7$ | 3.70 × 10$^7$ | 6.30 × 10$^6$ | 2.20 × 10$^8$ |

TABLE 4-continued

Storage modulus (Pa) of elastic layers

| Temperature | Elastic coating Composition A | Elastic coating Composition B | Elastic coating Composition C | Elastic coating Composition D | Elastic coating Composition E |
|---|---|---|---|---|---|
| 30° C. | $3.70 \times 10^8$ | $1.70 \times 10^7$ | $2.00 \times 10^7$ | $4.90 \times 10^6$ | $1.30 \times 10^8$ |
| 50° C. | $5.40 \times 10^7$ | $1.50 \times 10^7$ | $5.30 \times 10^6$ | $2.50 \times 10^6$ | $2.00 \times 10^7$ |
| 70° C. | $3.50 \times 10^7$ | $1.50 \times 10^7$ | $3.20 \times 10^6$ | $1.60 \times 10^6$ | $9.00 \times 10^6$ |
| 90° C. | $3.40 \times 10^7$ | $1.40 \times 10^7$ | $2.80 \times 10^6$ | $1.10 \times 10^6$ | $7.30 \times 10^6$ |

TABLE 5

Calculation of Equation (1) - E'[−30° C.]/E'[50° C.]

| | Elastic coating Composition A | Elastic coating Composition B | Elastic coating Composition C | Elastic coating Composition D | Elastic coating Composition E |
|---|---|---|---|---|---|
| E' [−30° C.] (Pa) | $2.10 \times 10^9$ | $2.10 \times 10^9$ | $2.30 \times 10^9$ | $1.80 \times 10^9$ | $1.80 \times 10^9$ |
| E' [50° C.] (Pa) | $5.40 \times 10^7$ | $1.50 \times 10^7$ | $5.30 \times 10^6$ | $2.50 \times 10^6$ | $2.00 \times 10^7$ |
| ΔE | 38.9 | 140.0 | 434.0 | 720.0 | 90.0 |

As can be seen from the above results, ΔE' of the elastic layers prepared with the elastic coating compositions A, B, and E, respectively, was confirmed to be 300 or less, whereas ΔE' of the elastic layers prepared with the elastic coating compositions C and D, respectively, was greater than 300.

Test Example 2: Nanoindentation Test (Elastic Layer)

a. Sample: Single elastic layer samples were each prepared in A4 size from the elastic coating compositions A to E in the same manner as in Section a of Test Example 1 above. Thereafter, it was stored at 25±5° C. and 50±5% RH until the test without additional pretreatment.

b. Equipment and methods: the Vickers hardness ($H_V$), indentation hardness ($H_{IT}$), indentation modulus ($E_{IT}$), recovery relation ($\eta_{IT}$), and indentation creep ($C_{IT}$) for the sample were measured using a nanoindentation surface analyzer (FISCHERSCOPE HM2000, FISCHER) according to the ISO 14577-1:2002(E) and 11.4577-2:2002(E) standards.

Specifically, the single elastic layer film was placed on a glass test plate (Fischerscope Part no. 600-028) having a thickness of about 31 as a sample holder, Thereafter, the nanoindentation test was carried out in which a diamond tip was pressed downward for 15 seconds at a force of 30 mN at room temperature and crept for five seconds; thereafter, it was raised upward.

In addition, the recovery was calculated by following equation. Recovery (%)=$[(h_{max}-h_p)/h_{max}] \times 100$. Here, $h_{max}$ is the maximum indentation depth (μm) during which the surface of the hard coating layer is pressed downward for 15 seconds at a force of 30 mN and held for 5 seconds, and $h_p$ is the depth (μm) of the indentation that remains unrecovered even after the force is released.

c. Results: The nanoindentation test results are shown in Table 6 below

TABLE 6

Surface hardness of single elastic layers

| | $H_V$ (N/mm²) | $H_{IT}$ (N/mm²) | $E_{IT}$ (MPa) | $\eta_{IT}$ (%) | $C_{IT}$ (%) | $h_{max}$ (μm) | Recovery (%) |
|---|---|---|---|---|---|---|---|
| Elastic coating composition A | 3.05 | 32.33 | 1115.69 | 25.962 | 11.867 | 6.7121 | 39.8947 |
| Elastic coating composition B | 0.32 | 3.370 | 139.25 | 24.744 | 10.449 | 20.1941 | 38.3589 |
| Elastic coating composition C | 1.33 | 14.07 | 114.60 | 95.674 | 0.613 | 12.9515 | 87.4007 |
| Elastic coating composition D | 0.22 | 2.32 | 48.54 | 49.943 | 4.698 | 25.8729 | 59.2284 |
| Elastic coating composition E | 1.44 | 15.23 | 464.19 | 28.449 | 11.693 | 9.8662 | 44.8965 |

Example 1: Preparation of a Composite Film

Step (1): Formation of a Hard Coating Layer

A hard coating composition as shown in Table 1 was coated on the upper side of a transparent polyester film (NRF, SKC) having a thickness of 65 μm by a die coating method. Thereafter, it was thermally treated at a temperature of 60° C. for 3 minutes to dry the solvent in the coating layer and cured by irradiating UV light at a dose of 1 J/cm² to prepare a hard coating layer having a thickness of about 5 μm.

Step (2): Formation of an Elastic Layer

Elastic coating composition A was coated on the opposite surface (i.e., the lower side of the polyester film) to the side on which the hard coating layer had been formed with a Mayer bar. Thereafter, it was thermally treated at 60° C. for 2 minutes to dry the solvent in the coating composition and irradiated with UV light at a dose of 1 J/cm² in a nitrogen atmosphere.

As a result, a composite film having a three-layer structure of a hard coating layer (5 μm), a polyester film (65 μm), and an elastic layer (30 μm) was obtained.

Example 2

A composite film was prepared in the same manner as in Example 1, except that elastic coating composition B was used for coating the elastic layer.

Example 3

A composite film was prepared in the same manner as in Example 1, except that elastic coating composition E was used for coating the elastic layer.

Comparative Example 1

A composite film having a two-layer structure of a hard coating layer (5 μm) and a polyester film (65 μm) was prepared in the same manner as in Example 1, except that an elastic layer was not formed.

Comparative Example 2

A composite film was prepared in the same manner as in Example 1, except that elastic coating composition C was used for coating the elastic layer.

Comparative Example 3

A composite film was prepared in the same manner as in Example 1, except that elastic coating composition D was used for coating the elastic layer.

Test Example 3: Modulus (Base Film)

The storage modulus of the base film (polyester-based film) was measured in a temperature range of −50° C. to 90° C. in the same manner as in Test Example 1, which showed that the storage modulus gradually decreased from about $2.6 \times 10^9$ Pa to $1.4 \times 10^9$ Pa as the temperature was raised.

Test Example 4: Nanoindentation Test (Hard Coating Layer of Composite Film)

a. Sample: The composite films prepared in the Examples and Comparative Examples were each cut to A4 size. It was stored at 25±5° C. and 50±5% RH until the test without additional pretreatment.
b. Equipment and methods: A nanoindentation test was carried out on the surface of the hard coating layer of a composite film sample with the same equipment and methods as Section b of Test Example 2 above.
c. Results: The nanoindentation test results are shown in Table 7 below.
d. Analysis: The surface hardness of Examples 1 to 3 was compared with Comparative Example 1 and shown in Table 8 below.

TABLE 7

| | Elastic coating Composition | Surface hardness of hard coating layer in composite films | | | | | | |
|---|---|---|---|---|---|---|---|---|
| | | $H_V$ (N/mm²) | $H_{IT}$ (N/mm²) | $E_{IT}$ (MPa) | $\eta_{IT}$ (%) | $C_{IT}$ (%) | $h_{max}$ (μm) | Recovery (%) |
| Ex. 1 | A | 31.17 | 329.87 | 2990.31 | 62.255 | 4.534 | 2.5864 | 70.5650 |
| Ex. 2 | B | 31.39 | 332.21 | 2886.96 | 64.264 | 4.324 | 2.6332 | 71.0614 |
| Ex. 3 | E | 31.40 | 332.26 | 2914.00 | 63.428 | 4.336 | 2.6001 | 70.8254 |
| C. Ex. 1 | — | 28.94 | 316.85 | 3172.37 | 60.418 | 4.307 | 2.5726 | 68.8801 |
| C. Ex. 2 | C | 29.74 | 325.32 | 2607.81 | 65.339 | 4.470 | 2.6971 | 72.2270 |
| C. Ex. 3 | D | 29.88 | 326.79 | 2415.83 | 67.430 | 3.995 | 2.7576 | 73.3729 |

TABLE 8

| | Elastic coating Composition | Difference from Comparative Example 1 | | | | | | |
|---|---|---|---|---|---|---|---|---|
| | | $\Delta H_V$ (N/mm²) | $\Delta H_{IT}$ (N/mm²) | $\Delta E_{IT}$ (MPa) | $\Delta \eta_{IT}$ (%) | $\Delta C_{IT}$ (%) | $\Delta h_{max}$ (μm) | $\Delta$Recovery (%) |
| Ex. 1 | A | 2.23 | 13.02 | −182.06 | 1.837 | 0.227 | 0.0138 | 1.6849 |
| Ex. 2 | B | 2.45 | 15.36 | −285.41 | 3.846 | 0.017 | 0.0606 | 2.1813 |
| Ex. 3 | E | 2.46 | 15.41 | −258.37 | 3.010 | 0.029 | 0.0275 | 1.9453 |

As can be seen from the above results, in the composite films of Examples 1 to 3, which selectively adopted an elastic layer formed using the elastic coating compositions A, B, and E in which the ratio of the storage modulus with respect to temperature was adjusted to a desired range, the nanoindentation surface hardness characteristics of the opposite side (hard coating layer) were excellent.

Specifically, as shown in Table 8, the composite films of Examples 1 to 3 had enhanced nanoindentation surface hardness characteristics ($H_V$, recovery, $H_{IT}$, $H_{IT}$, $E_{IT}$, $\eta_{IT}$, $C_{IT}$, and $h_{max}$) as compared with the composite film of Comparative Example 1 in which an elastic layer was not adopted.

Meanwhile, in the composite films of Comparative Examples 2 and 3, which adopted an elastic layer, the ratio of the storage modulus with respect to temperature was outside the desired range by using the elastic coating compositions C and D; thus, the nanoindentation surface hardness characteristics were inferior to those of the composite films of Examples 1 to 3.

The invention claimed is:

1. A composite film, which comprises a base film; a hard coating layer disposed on one side of the base film; and an elastic layer disposed on the other side of the base film, wherein the ΔE' value according to the following Equation (1) is 2 to 300:

$$\Delta E' = E'[-30°\ C.]/E'[50°\ C.] \qquad (1)$$

in which E'[−30° C.] is the storage modulus (Pa) of the elastic layer at −30° C., and E'[50° C.] is the storage modulus (Pa) of the elastic layer at 50° C., and wherein the composite film has an Hv increase (N/mm$^2$) of 2.0 N/mm$^2$ or more as calculated by the following Equation (2) and a recovery increase of 1.5% or more as calculated by the following Equation (3):

$$H_V\ \text{increase}(N/mm^2) = H_V1(N/mm^2) - H_V2(N/mm^2) \qquad (2)$$

$$\text{Recovery increase}(\%) = \text{Recovery1}(\%) - \text{Recovery2}(\%) \qquad (3)$$

in which $H_V1$ is the Vickers hardness ($H_V$) (N/mm$^2$) of the composite film, $H_V^2$ is the Vickers hardness ($H_V$) (N/mm$^2$) of a film having a layer structure excluding the elastic layer from the composite film, Recovery1 is the recovery (%) of the composite film, and Recovery2 is the recovery (%) of a film having a layer structure excluding the elastic layer from the composite film, wherein the composite film has a Vickers hardness ($H_V$) of 30 N/mm$^2$ or more when measured for the surface of the hard coating layer by a nanoindentation test according to the ISO 14577-1: 2002 (E) standard and a recovery of 69% or more as calculated by the following equation:

$$\text{Recovery}(\%) = [(h_{max} - h_p)/h_{max}] \times 100$$

in which $h_{max}$ is the maximum indentation depth (μm) during which the surface of the hard coating layer is pressed downward for 15 seconds at a force of 30 mN and held for 5 seconds, and hp is the depth (μm) of the indentation that remains unrecovered even after the force is released, wherein the ratio of the storage modulus of the elastic layer to the storage modulus of the base film (elastic layer/base film) is 0.5 or less at 25° C., wherein the elastic layer comprises a UV-curable urethane acrylate-based oligomer having 2 to 8 functional groups, and wherein the hard coating layer comprises at least one selected from the group consisting of a urethane acrylate-based compound, an acrylic ester-based compound, and an epoxy acrylate-based compound.

2. The composite film of claim 1, wherein the storage modulus of the elastic layer is 1×10$^9$ Pa to 3×10$^9$ Pa at −30° C. and 1×10$^7$ Pa to 1×10$^8$ Pa at 50° C.

3. The composite film of claim 1, wherein the thickness of the base film is 40 μm to 200 μm, the thickness of the hard coating layer is 2 μm to 20 μm, and the thickness of the elastic layer is 10 μm to 100 μm.

4. The composite film of claim 1, wherein the base film comprises at least one selected from the group consisting of a polymer film or ultra-thin glass (UTG).

5. A display device, which comprises a display panel; and a cover window disposed on the front side of the display panel, wherein the cover window comprises a base film; a hard coating layer disposed on one side of the base film; and an elastic layer disposed on the other side of the base film, and wherein the ΔE' value according to the following Equation (1) is 2 to 300:

$$\Delta E' = E'[-30°\ C.]/E'[50°\ C.] \qquad (1)$$

in which E'[−30° C.] is the storage modulus (Pa) of the elastic layer at −30° C., and E'[50° C.] is the storage modulus (Pa) of the elastic layer at 50° C., and wherein the cover window has an Hv increase (N/mm$^2$) of 2.0 N/mm$^2$ or more as calculated by the following Equation (2) and a recovery increase of 1.5% or more as calculated by the following Equation (3):

$$H_V\ \text{increase}(N/mm^2) = H_V1(N/mm^2) - H_V^2(N/mm^2) \qquad (2)$$

$$\text{Recovery increase}(\%) = \text{Recovery1}(\%) - \text{Recovery2}(\%) \qquad (3)$$

in which $H_V1$ is the Vickers hardness ($H_V$) (N/mm$^2$) of the composite film, $H_V^2$ is the Vickers hardness ($H_V$) (N/mm$^2$) of a film having a layer structure excluding the elastic layer from the composite film, Recovery1 is the recovery (%) of the composite film, and Recovery2 is the recovery (%) of a film having a layer structure excluding the elastic layer from the composite film, wherein the composite film has a Vickers hardness ($H_V$) of 30 N/mm$^2$ or more when measured for the surface of the hard coating layer by a nanoindentation test according to the ISO 14577-1: 2002 (E) standard and a recovery of 69% or more as calculated by the following equation:

$$\text{Recovery}(\%) = [(h_{max} - h_p)/h_{max}] \times 100$$

in which $h_{max}$ is the maximum indentation depth (μm) during which the surface of the hard coating layer is pressed downward for 15 seconds at a force of 30 mN and held for 5 seconds, and hp is the depth (μm) of the indentation that remains unrecovered even after the force is released, wherein the ratio of the storage modulus of the elastic layer to the storage modulus of the base film (elastic layer/base film) is 0.5 or less at 25° C., wherein the elastic layer comprises a UV-curable urethane acrylate-based oligomer having 2 to 8 functional groups, and wherein the hard coating layer comprises at least one selected from the group consisting of a urethane acrylate-based compound, an acrylic ester-based compound, and an epoxy acrylate-based compound.

* * * * *